N. W. STORER.
ELECTRIC LOCOMOTIVE.
APPLICATION FILED MAR. 2, 1908.

981,713.

Patented Jan. 17, 1911.
3 SHEETS—SHEET 2.

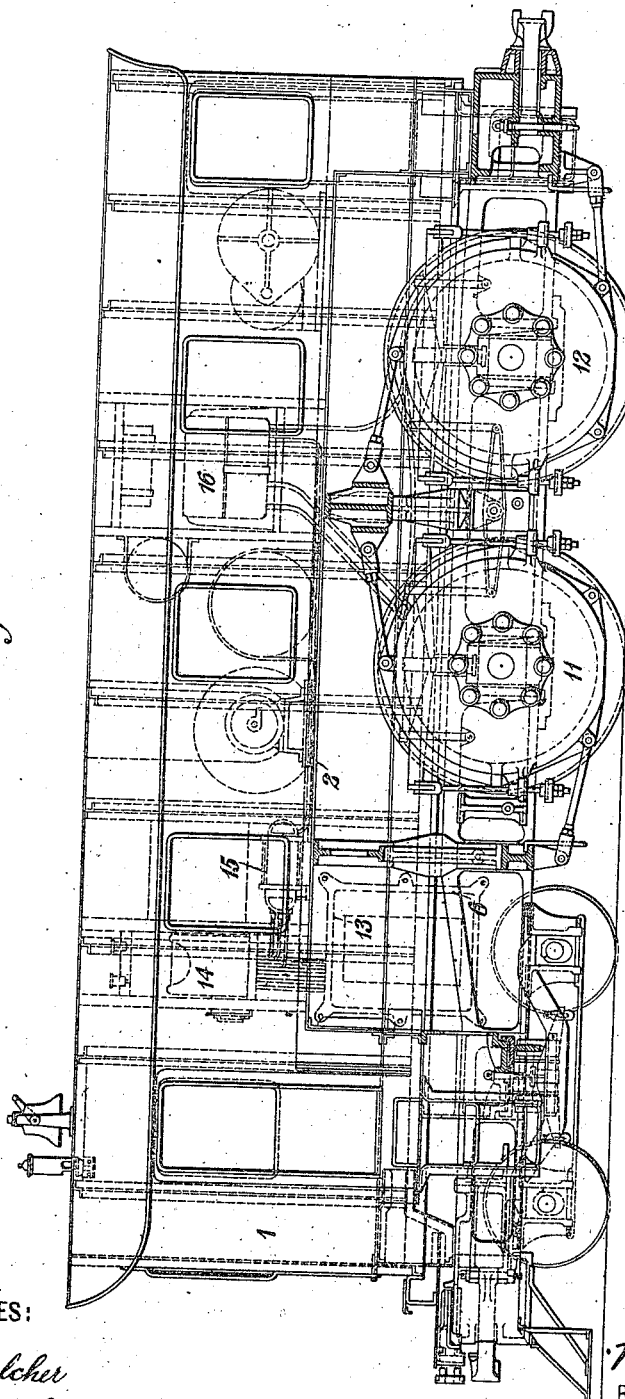

UNITED STATES PATENT OFFICE.

NORMAN W. STORER, OF PITTSBURG, PENNSYLVANIA, ASSIGNOR, BY MESNE ASSIGNMENTS, TO WESTINGHOUSE ELECTRIC & MANUFACTURING COMPANY, OF EAST PITTSBURG, PENNSYLVANIA, A CORPORATION OF PENNSYLVANIA.

ELECTRIC LOCOMOTIVE.

981,713.

Specification of Letters Patent. Patented Jan. 17, 1911.

Application filed March 2, 1908. Serial No. 418,896.

*To all whom it may concern:*

Be it known that I, NORMAN W. STORER, a citizen of the United States, and a resident of Pittsburg, in the county of Allegheny and State of Pennsylvania, have invented a new and useful Improvement in Electric Locomotives, of which the following is a specification.

My invention relates to electric locomotives, and it has for its object to provide a locomotive having a simple, compact and convenient structure and arrangement of parts.

The invention consists in providing the floor of the cab or body of the locomotive with a central platform upon which the auxiliary and controlling apparatus of the locomotive is mounted, a passageway being thus provided adjacent to the sides of the cab, so that doors and ventilating openings may be located therein wherever desired, and also so that the controlling and other auxiliary apparatus may be rendered readily accessible for inspection and repairs. The motors and other parts associated with the running gear of the locomotive extend upwardly into the recess provided in the floor of the cab by the platform, the clearance spaces beneath the platform being sufficient to permit of ready inspection of the motors and other parts of the running gear.

Figure 1:
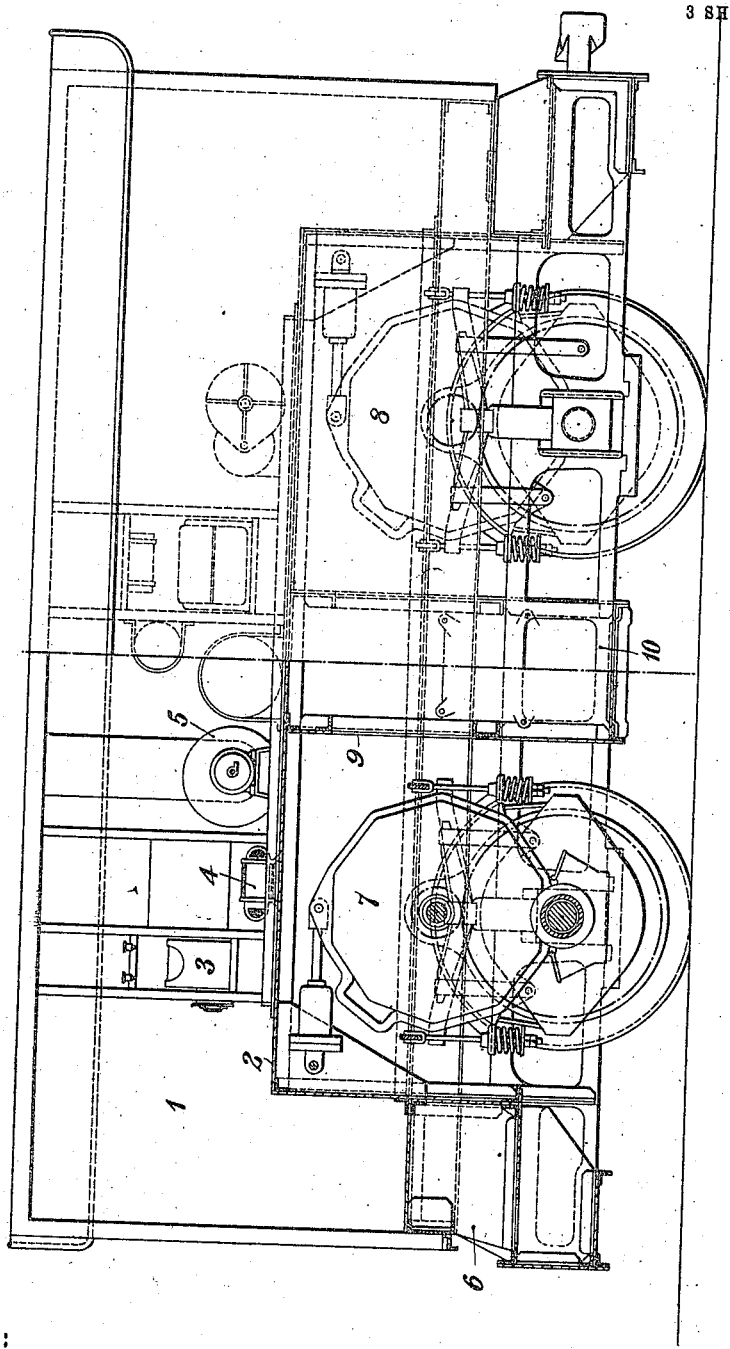
Figure 2:
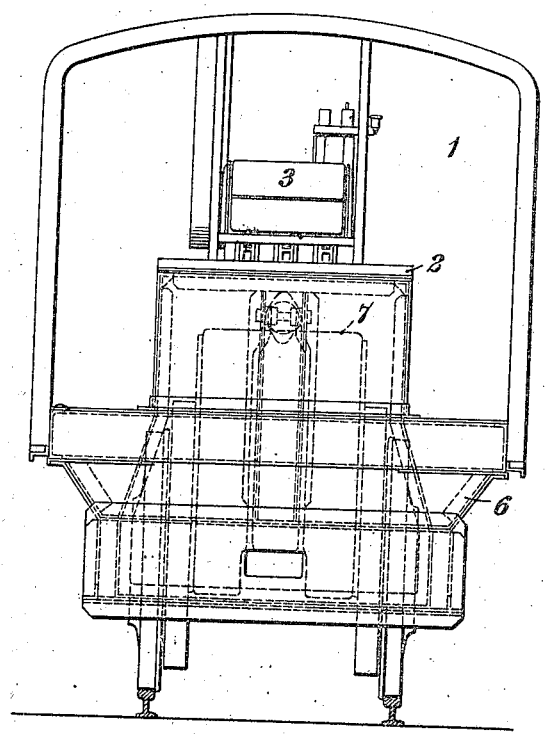

Figure 1 of the accompanying drawings is a view, partially in side elevation and partially in vertical section, of a locomotive constructed in accordance with my invention. Fig. 2 is a view, in end elevation, of the locomotive of Fig. 1, and Fig. 3 is a view in side elevation and in section of a modification of the locomotive of Fig. 1.

The floor of a cab or body 1 of the locomotive is provided with a central platform or supporting structure 2, upon which are mounted various controlling and auxiliary devices, such as a group of controlling switches 3, a choke coil 4, an air compressor motor 5, etc., a passageway being thus provided between the platform and the apparatus mounted thereon and the sides of the cab. The cab 1 is supported upon a truck frame 6 that comprises means, such, for example, as that set forth in another application, Serial No. 350,965 (Case 1806), filed jointly by another and myself, and assigned to the Westinghouse Electric & Manufacturing Company, for resiliently supporting propelling motors 7 and 8 for the locomotive above the driving axles, the motors and other parts of the running gear projecting into the recess provided in the bottom of the cab by the platform 2.

Suspended from the bottom of the cab, between the propelling motors, is a structure 9 adapted to support a transformer 10 or other parts of considerable weight and bulk that could not be readily placed within or removed from the cab.

The invention has also been found useful when the propelling motors surround the driving axles and are operatively connected thereto without the intervention of speed changing gears, as illustrated in Fig. 3, in which the motors 11 and 12 are mounted in a manner similar to that set forth in Patent No. 816,611. In this figure, the main transformer 13 is suspended near the front end of the locomotive from the bottom of the cab and extends into the recess provided by the platform. Directly above the transformer, and mounted upon the platform, is a group of unit switches 14 and preventive or choke coils 15 constituting parts of the controlling apparatus for the motors. Directly above the motors 11 and 12 is another group of unit switches 16 also employed in controlling the operation of the motors, their specific purpose in the present instance being to govern the direction of rotation of the motors. The circuit arrangements of the said parts and the exact manner in which they perform their functions constitute no part of the present invention and further illustration and description thereof are accordingly deemed unnecessary. It should, however, be noted that since the switch group 14 is located directly above the transformer 13 the large number of connections employed between the said parts are relatively short, and since the preventive coils 15 are close to the switch group 14 the connections between the said parts are also relatively short. A single connection is employed between the preventive coils and the switch group 16 and only relatively short connections are again required between the said group and the motors. Thus, it is seen that the expense and complication of the wiring of the locomotive are materially reduced.

The invention is applicable in all cases where it is desired to provide an adequate amount of space for ready inspection and repair of the motors and parts of the running gear regardless of the mode of mounting and construction thereof, and also in all cases where a convenient arrangement of the apparatus within the cab is desired.

I claim as my invention:

1. A locomotive comprising a cab or body having a central floor portion at a materially higher elevation than the side and end floor portions and connected thereto by side and end walls to form a chamber, propelling apparatus projecting into said chamber and control apparatus mounted upon said central floor portion.

2. A locomotive comprising a cab or body having a central floor portion at a materially higher elevation than the side and end floor portions and connected thereto by side and end walls to form a chamber, and running gear, portions of which are located in said chamber.

3. A locomotive comprising a cab or body having a central floor portion at a materially higher elevation than the side and end floor portions and connected thereto by side and end walls to form a chamber, running gear, portions of which are located in said chamber, and auxiliary apparatus mounted upon the central floor portion.

4. A locomotive comprising a cab or body having a central floor portion at a materially higher elevation than the side and end floor portions and connected thereto by side and end walls to form a chamber, running gear partially located in said chamber, auxiliary apparatus mounted upon the central floor portion, and other auxiliary apparatus suspended from said central floor portion.

In testimony whereof, I have hereunto subscribed my name this 10th day of Feby., 1908.

NORMAN W. STORER.

Witnesses:
HIRAM A. TAYLOR,
OTTO S. SCHAIRER.